United States Patent
Hui et al.

(10) Patent No.: US 9,491,051 B2
(45) Date of Patent: Nov. 8, 2016

(54) CENTRALIZED ADJUSTMENT OF DATA RATES IN MESH NETWORKS

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 14/290,300

(22) Filed: May 29, 2014

(65) Prior Publication Data

US 2015/0350018 A1 Dec. 3, 2015

(51) Int. Cl.

| | |
|---|---|
| *H04L 12/26* | (2006.01) |
| *H04L 12/24* | (2006.01) |
| *H04L 12/825* | (2013.01) |
| *H04L 29/08* | (2006.01) |
| *H04W 84/18* | (2009.01) |
| *H04W 28/02* | (2009.01) |
| *H04L 12/801* | (2013.01) |
| *H04W 24/02* | (2009.01) |
| *H04L 12/751* | (2013.01) |

(52) U.S. Cl.
CPC ....... *H04L 41/0816* (2013.01); *H04L 41/0896* (2013.01); *H04L 41/12* (2013.01); *H04L 41/145* (2013.01); *H04L 47/11* (2013.01); *H04L 47/25* (2013.01); *H04L 67/12* (2013.01); *H04W 28/0221* (2013.01); *H04W 84/18* (2013.01); *H04L 45/02* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 5,696,903 | A | 12/1997 | Mahany |
| 7,583,637 | B2 | 9/2009 | Lau et al. |
| 8,630,269 | B1 | 1/2014 | Chang et al. |
| 8,650,301 | B2 | 2/2014 | Luzzatti et al. |
| 8,971,200 | B2 * | 3/2015 | Van Wyk .................. H04B 3/46 370/252 |
| 2006/0209763 | A1 * | 9/2006 | Emeott ................. H04L 1/0002 370/332 |
| 2010/0074304 | A1 | 3/2010 | Flammer, III |
| 2010/0177731 | A1 * | 7/2010 | Ananthaiyer ......... H04W 28/22 370/329 |
| 2013/0016758 | A1 | 1/2013 | Hui et al. |
| 2014/0092774 | A1 * | 4/2014 | Karimi ..................... H04B 1/69 370/254 |

OTHER PUBLICATIONS

Gnawali, et al., "The Minimum Rank with Hysteresis Objective Function", Request for Comments 6719, Sep. 2012, 13 pages, Internet Engineering Task Force Trust.

(Continued)

*Primary Examiner* — Rhonda Murphy
(74) *Attorney, Agent, or Firm* — Parker Ibrahim & Berg LLC; James M. Behmke; Stephen D. LeBarron (57) ABSTRACT

In one embodiment, a method is disclosed in which a device receives data regarding a topology of a network. Traffic data for one or more data links in the network and performance data for the one or more data links are also received. A data rate change is simulated for the one or more data links using the topology data, traffic data, and performance data. Based on the simulated data rate change, a data rate change command is provided to one or more nodes associated with the one or more data links.

20 Claims, 10 Drawing Sheets

(56) References Cited

OTHER PUBLICATIONS

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Request for Comments 6550, Mar. 2012, 157 pages, Internet Engineering Task Force.

* cited by examiner

CENTRALIZED ADJUSTMENT OF DATA RATES IN MESH NETWORKS

TECHNICAL FIELD

The present disclosure relates generally to computer networks, and, more particularly, to centrally adjusting data rates used in a mesh network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like also present unique challenges to LLNs.

A tradeoff exists when selecting a data rate to be used by an LLN device. In particular, selecting a lower data rate allows for an increased communication range and greater message reliability. Conversely, selecting a higher data rate allows for greater throughput and lower latency. Typical LLN solutions take a "one-size-fits-all" approach to data rate selection. In other words, a network device typically configures a single data rate at which the device is to receive data by selecting a data rate that balances these competing factors. All neighboring devices communicating with the device must then use that data rate when transmitting packets to the network device. In addition, the topology of the network may be affected by an individual node's choice of data rate, since the data rate selected by the node may also affect the communication range of the node. Thus, existing techniques to select a data rate in an LLN offer room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method is disclosed in which a device receives data regarding a topology of a network. Traffic data for one or more data links in the network and performance data for the one or more data links are also received. A data rate change is simulated for the one or more data links using the topology data, traffic data, and performance data. Based on the simulated data rate change, and considering the traffic SLA, a data rate change command is provided to one or more nodes associated with the one or more data links.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
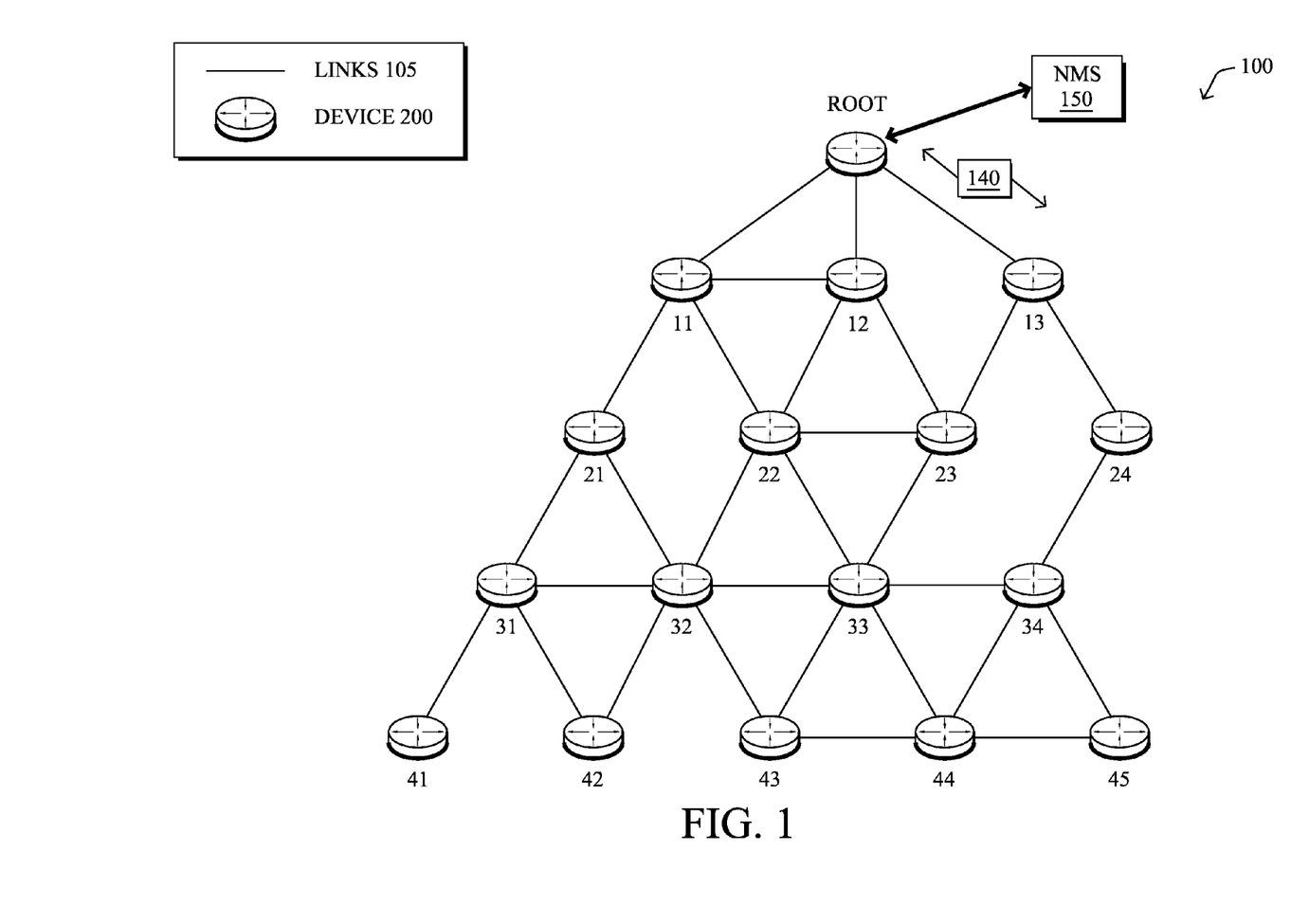
FIG. 1 illustrates an example communication network.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
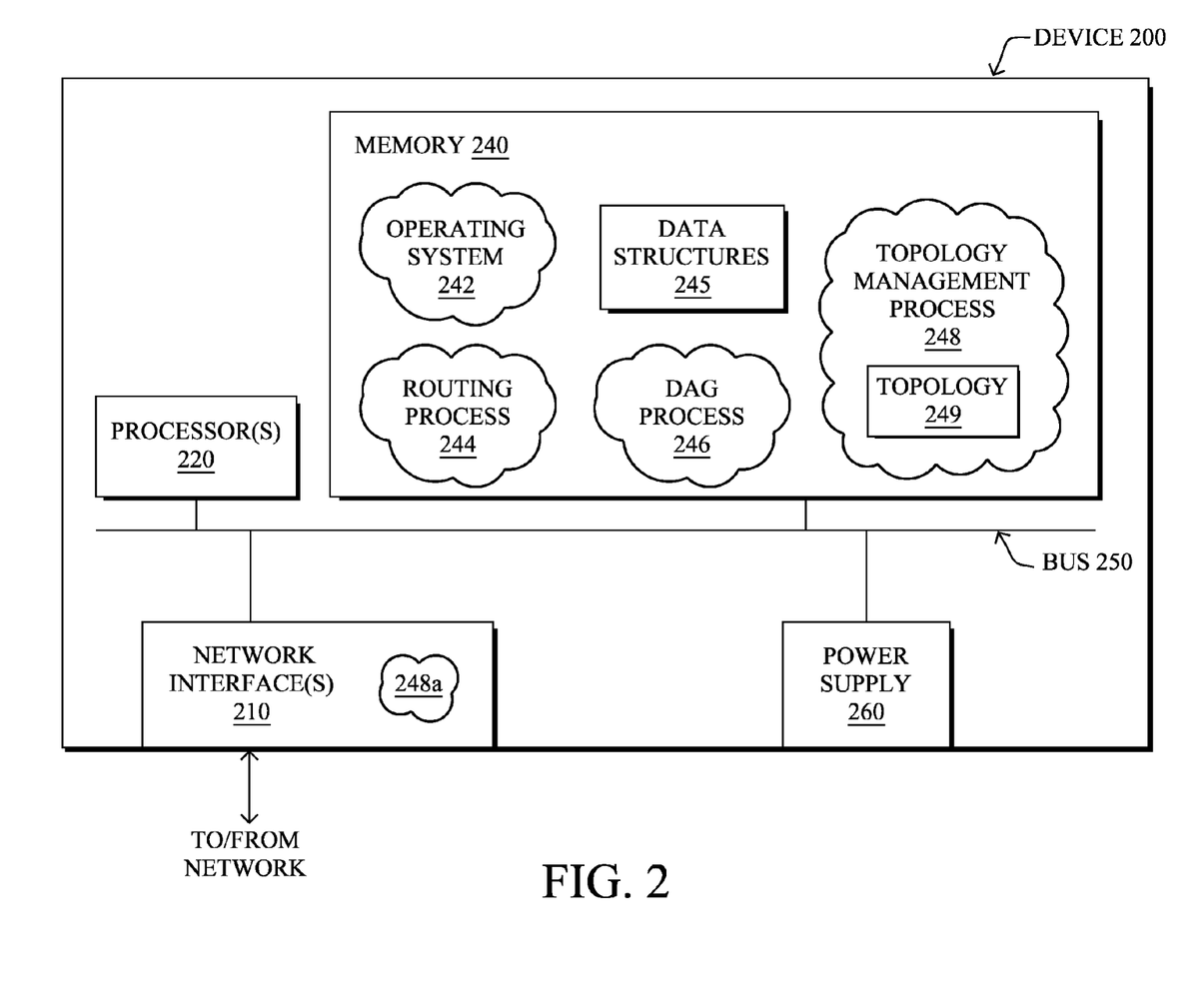
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative topology management process 248 that determines a network topology 249, as described herein. Note that while processes 244-248 are shown in centralized memory 240, alternative embodiments provide for any or all of the processes to be specifically operated within the network interfaces 210, such as a component of a MAC layer (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. In a DAG, all edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
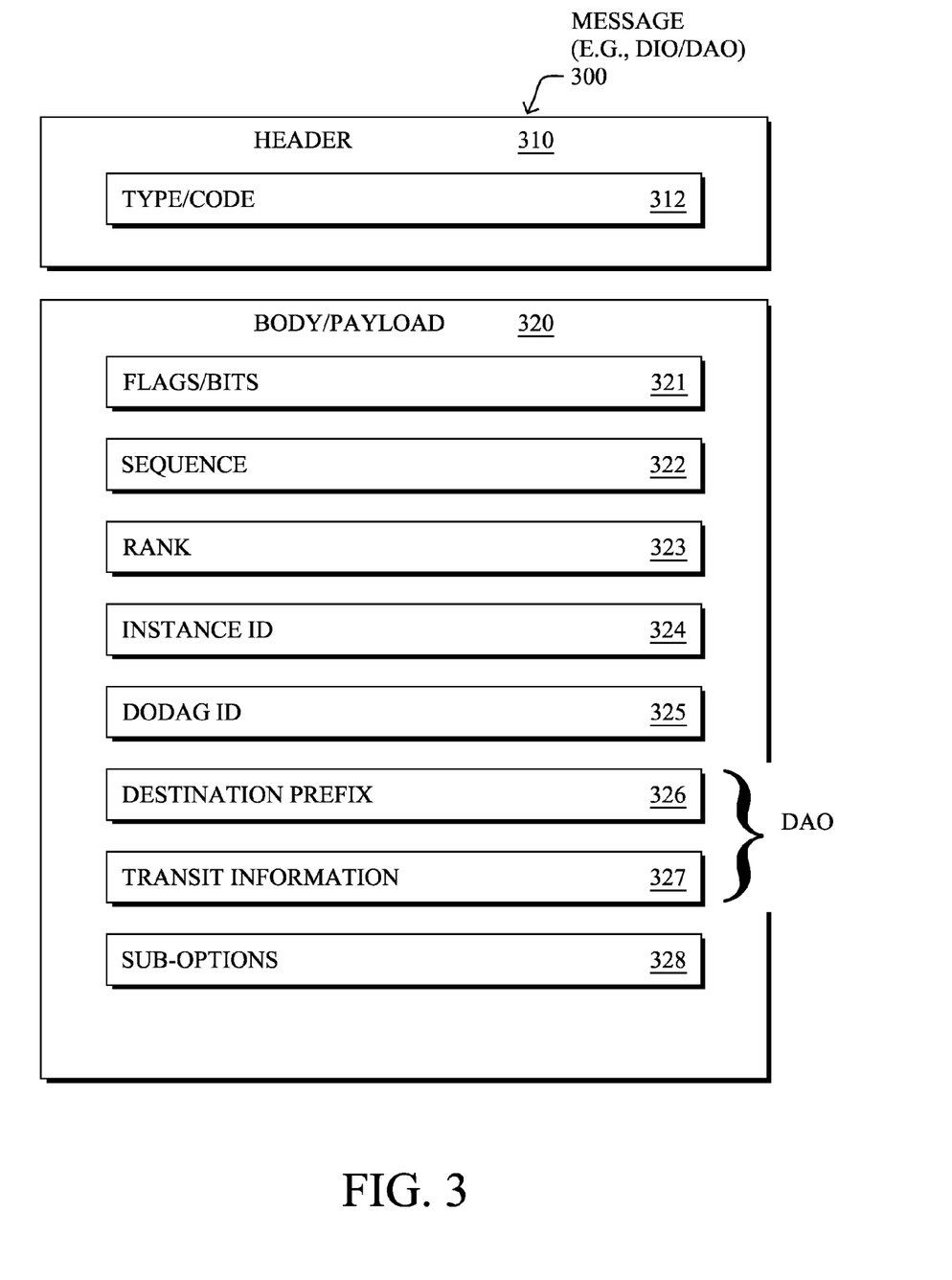
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
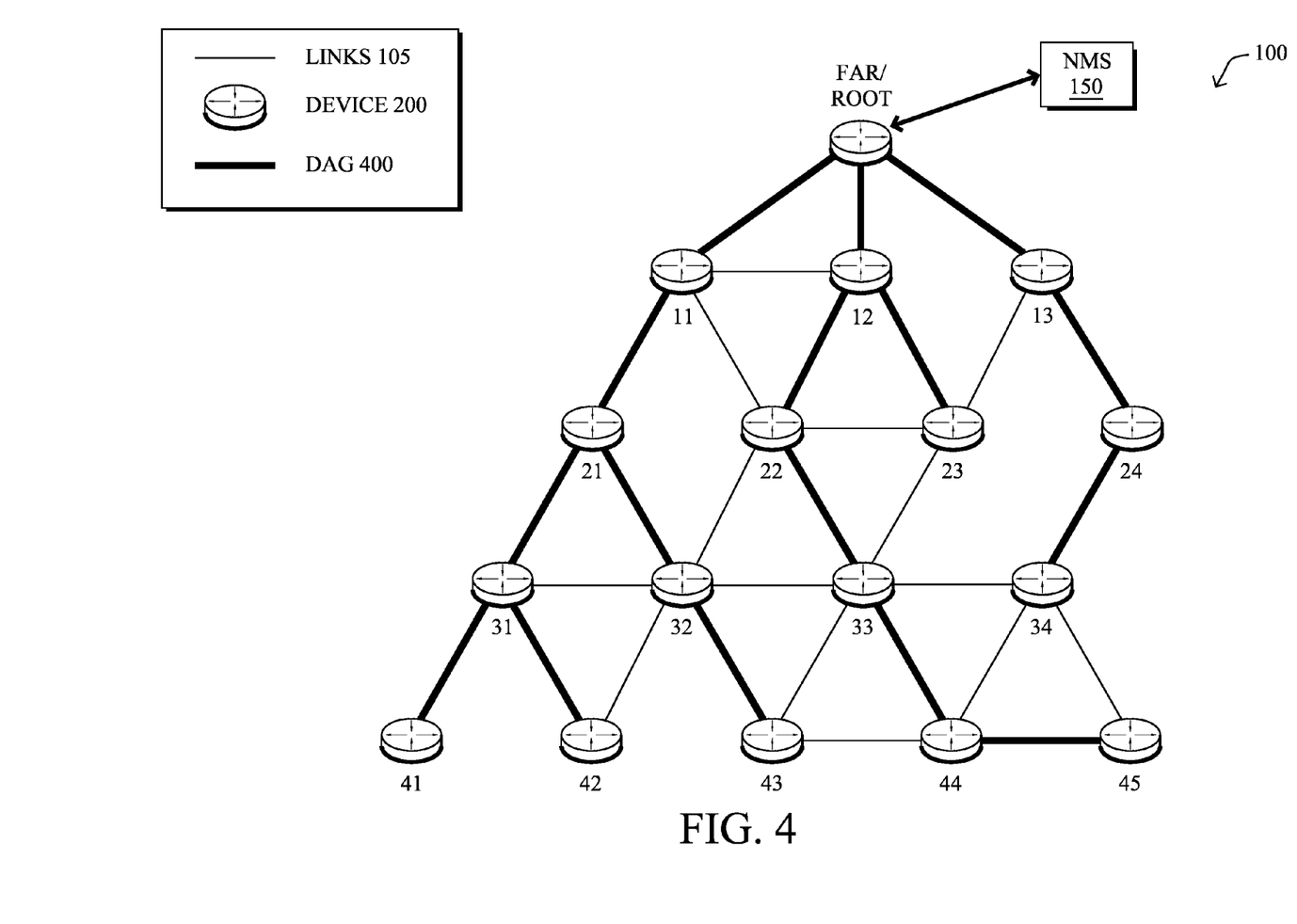
FIG. 4 illustrates an example directed acyclic graph (DAG)

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

As noted above, data rate selection in a mesh network (e.g., an LLN), can affect both network performance as well as the topology of the network. In particular, lower data rates typically afford greater range and reliability to a device at the expense of data throughput. Conversely, higher data rates decrease latency but at the expense of range and reliability. Thus, many existing solutions take a balanced approach to selecting the data rate used for a given data link. In addition, the decision is typically made at the individual device level based on data received from the device's neighbors.

Centralized Adjustment of Data Rates in a Mesh Network

The techniques herein generally provide for a centralized device to adjust the data rates used by the various nodes of a mesh network. The centralized device (e.g., a root device, NMS, etc.) may collect data such as information about the routing topology of the network, traffic information, and/or network metrics to determine whether a data rate adjustment can improve performance of the network. In some aspects, a data rate change may be simulated by the centralized device prior to deployment, to determine whether the change is likely to improve network performance. If so, the device may send a command to one or more devices/nodes in the network to change their data rate allocation. In some cases, the centralized device may trigger actions using other protocols that may be affected by a data rate allocation change (e.g., routing changes, link metric computation changes, etc.). An iterative approach to changing data rate allocation may also be used based on observed performance changes after a data rate change has been initiated in the network.

Specifically, according to one or more embodiments of the disclosure as described in detail below, a method is disclosed in which a device receives data regarding a topology of a network. Traffic data for one or more data links in the network and performance data for the one or more data links are also received. A data rate change is simulated for the one or more data links using the topology data, traffic data, and performance data. Based on the simulated data rate change, a data rate change command is provided to one or more nodes associated with the one or more data links.

Illustratively, the techniques described herein may be performed by hardware, software, and/or firmware, such as in accordance with the process 248/248a, which may include computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the various PLC protocols or wireless communication protocols, and as such, may be processed by similar components understood in the art that execute those protocols, accordingly.

Operationally, a centralized network device (e.g., a DAG Root, NMS, etc.) may dynamically adjust the data rate allocations of network links using knowledge of the routing topology, traffic matrix, and/or network metrics. In particular, as shown in FIG. 1, a centralized network device (the FAR/Root or NMS 150) may receive information about the mesh network that is useful in determining the data rate allocation for links 102. In one embodiment, the centralized device receives information regarding the routing topology. Such information may allow the centralized device to determine how packets flow through the network. In some cases, the routing information may be obtained directly from routing protocol messages (e.g. an RPL DAO message, such as message 300). In other cases, the routing information may be obtained through other management protocols (e.g., a constrained application management protocol, such as CSMP). In another embodiment, the centralized device may receive traffic information/metrics that describes the amount of traffic flowing through each of links 102 under analysis. Other traffic-related information may also include data such as the reliability, latency, channel utilization, etc. of a given link 102. Such information may allow the central device to determine where improvements can be made and the side effects that changing the data rate allocation may have. In various cases, a traffic matrix including the traffic information may be retrieved from NMS 150 using a custom CoAP message, computed by the FAR (e.g., from packets sent by network nodes in non-storing mode to the FAR), or from any other source. In a further embodiment, the centralized device may receive performance metrics regarding the current data links used in the network or the network as a whole. For example, service level agreement (SLA) data may be analyzed by the centralized device and may include information regarding latency, jitter, etc., experienced in the network. Such information may be locally determined or dynamically retrieved from the NMS, in various cases.

According to various embodiments, the centralized network device may utilize the routing information, traffic matrix, link metrics, traffic SLA information, etc., to simulate changes to a data rate allocation for one or more links. This information provides a more global view than what is available to each node, allowing for smarter adjustments to data rate allocation. During simulation, the centralized network device may construct a model of the network based on the interconnection of nodes in the network (e.g., using the received topology/routing information) and the characteristics of the interconnections (e.g., using the received link metrics, etc.). The centralized device may then overlay the current traffic matrix onto the model and analyze the current performance of the network (e.g., whether or not traffic SLAs are being met, delays are present, etc.), to simulate the effects of changing a data rate allocation. In other words, the centralized network device may determine the effects of changing a data rate on the network based on the observed performance of the data rates actually used in the network.

Figure 5A:
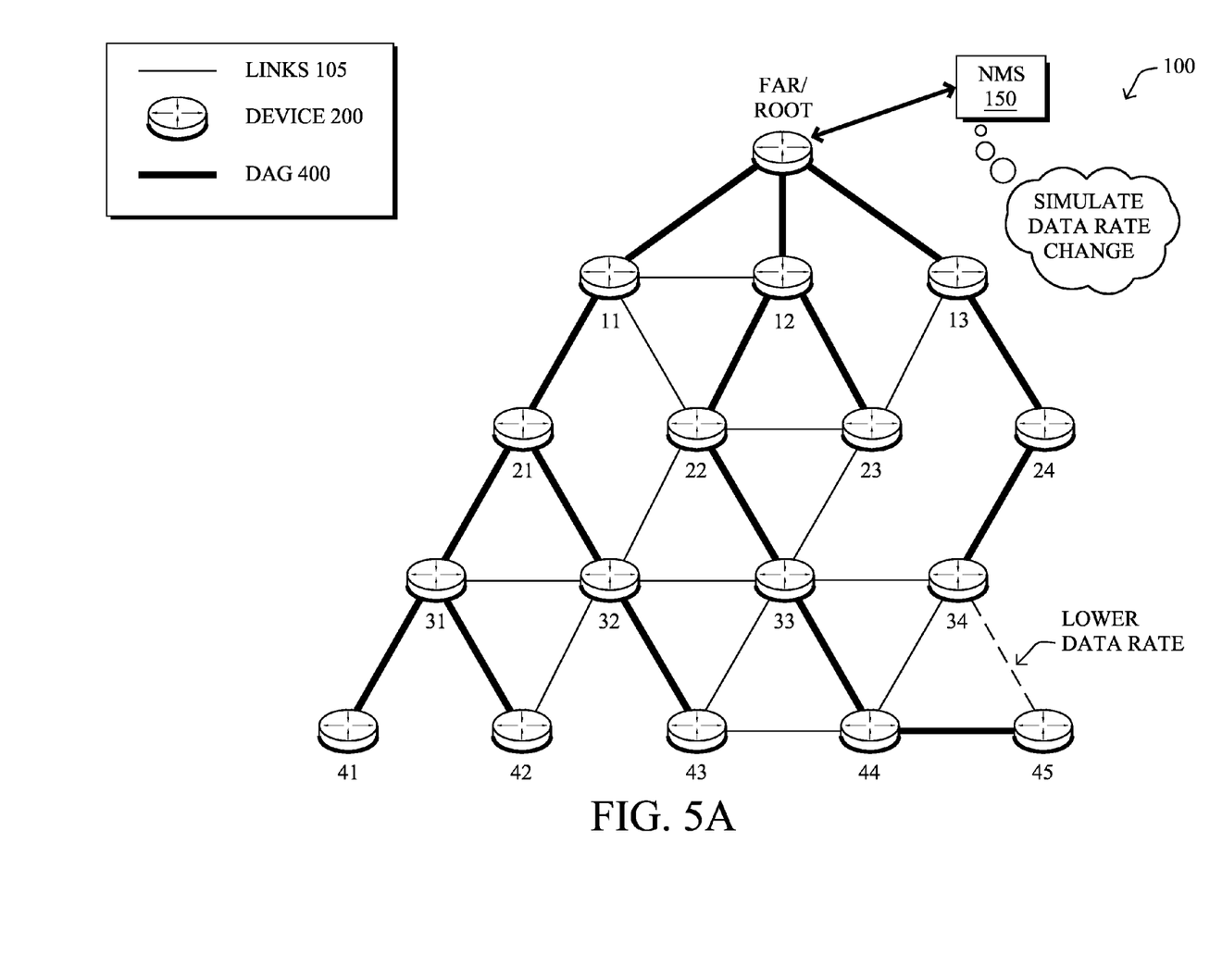
FIGS. 5A-5C illustrate an example of a simulated data rate change.
Figure 5B:
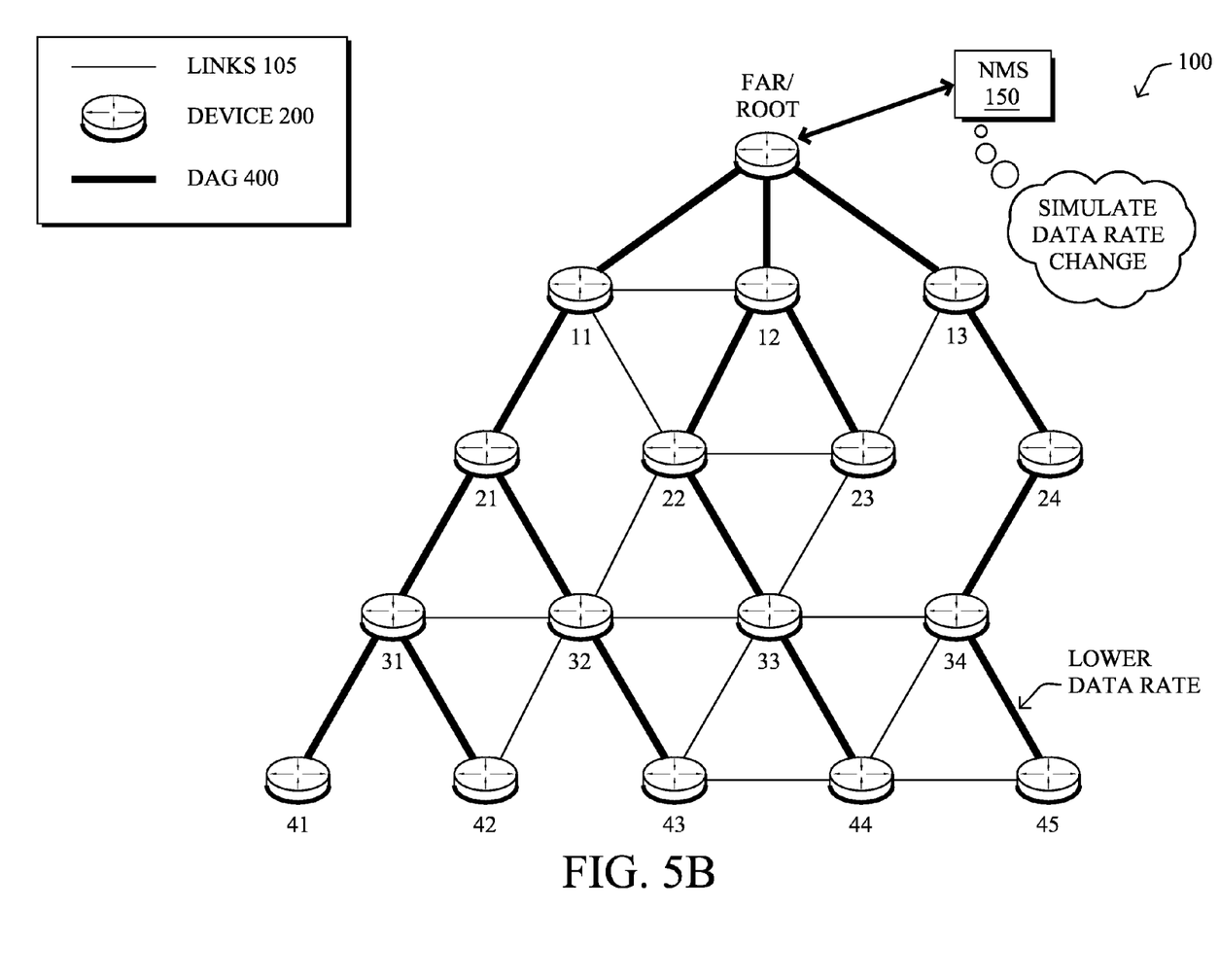

An example of a data rate change being simulated is shown in FIGS. 5A-5C. As shown in FIG. 5A, NMS 150 (e.g., a centralized network device) may use the received network information to simulate the effects of lowering the data rate between nodes/devices 34 and 45. When viewed in isolation (e.g., by either or both of nodes 34, 45), selection of the data rate between the two nodes provides the choice between throughput vs. range/robustness. However, when considering other neighboring links that also exist in the mesh environment, lowering the data rate may have other effects. For example, as shown in FIG. 5B, lowering the data rate between nodes 34, 45 also increases the range/robustness of the corresponding link, which may provide an alternate DAG path from node 45 to the DAG root. As shown, the new path would decrease the number of hops taken from node 45 to the root (e.g., five vs. four hops) and reduce end-to-end latency due to less node queuing delays. However, making such a data rate adjustment may also increase channel utilization since packet transmissions take longer, reducing the amount of channel capacity available for other traffic. Accordingly, the centralized device may use the simulation results to determine whether improving one network performance metric would also negatively impact another performance metric and, if so, determine whether the data rate adjustment is worth initiating.

Figure 5C:
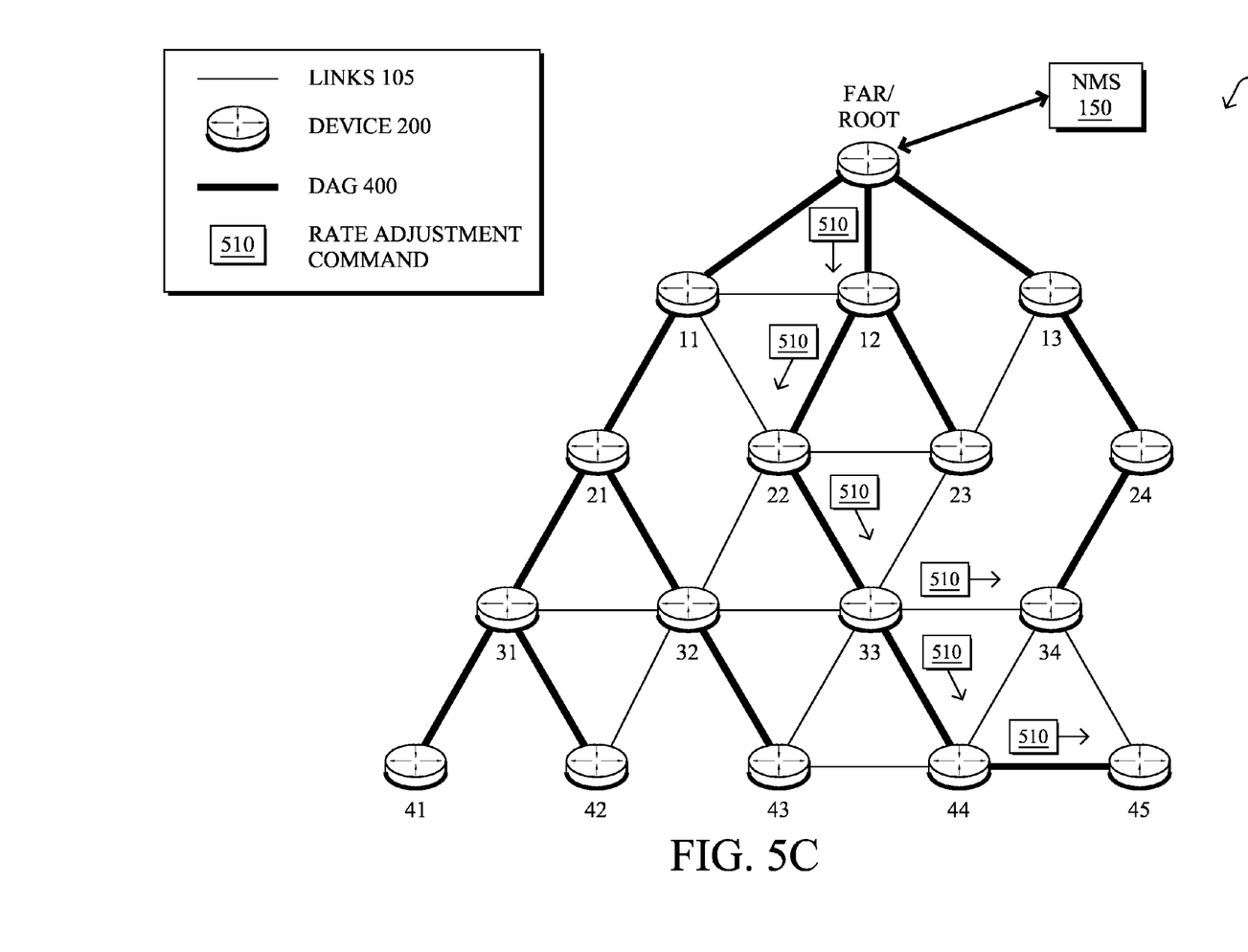

If the centralized device determines that a data rate adjustment should be made, it may send a rate adjustment command to the corresponding node(s). As shown in FIG. 5C, for example, NMS 150 may send a rate adjustment command 510 to node 45 and/or to node 34, to institute the data rate change between the devices. For example, rate adjustment command 510 may cause node 34 to decrease its reception data rate. In turn, node 45 may be notified of the change either from node 34 (e.g., node 34 may notify its neighbors of the rate adjustment), from the centralized device (e.g., via a separate command from the Root or NMS), or in any other manner. In one embodiment, the centralized device may apply data rate allocation changes by sending rate adjustment command 510 as a unicast message to a particular device/node. In another embodiment, the central device may send a multicast message when applying a number of changes simultaneously within the network.

In some embodiments, the centralized device may trigger actions in other protocols that may be affected by changes to a data rate allocation. For example, if the data rate allocation is expected to affect the routing topology significantly (since new links may be effectively added or removed), the central device may trigger a RPL version increment to rebuild the routing topology (e.g., DAG 400 may be rebuilt to include the link between nodes 34, 45). In another example, the traffic and link metrics may be reset so that they are not affected by historical results and converge more quickly.

The centralized device (e.g., NMS, DAG root, etc.) may also determine whether an implemented data rate change has actually resulted in the simulated effects on the network. As noted previously, the centralized device may initiate a data rate change based on simulated results, which can differ from the actual effects on the network. Thus, after applying a change of one or more link rates based on a local simulation, the centralized device may start an active monitoring period to monitor the actual effects on the network. For example, the centralized device may check the stability of the network links, the stability of the routing topology, the effects of the SLA on traffic, or perform other such functions. In some cases, the centralized device may inform a set of node(s) to start sending active probes on a set of given paths that will be used in order to check that expected SLA improvements. In response, the node(s) may return performance data back to the centralized device for further analysis.

Figure 6A:
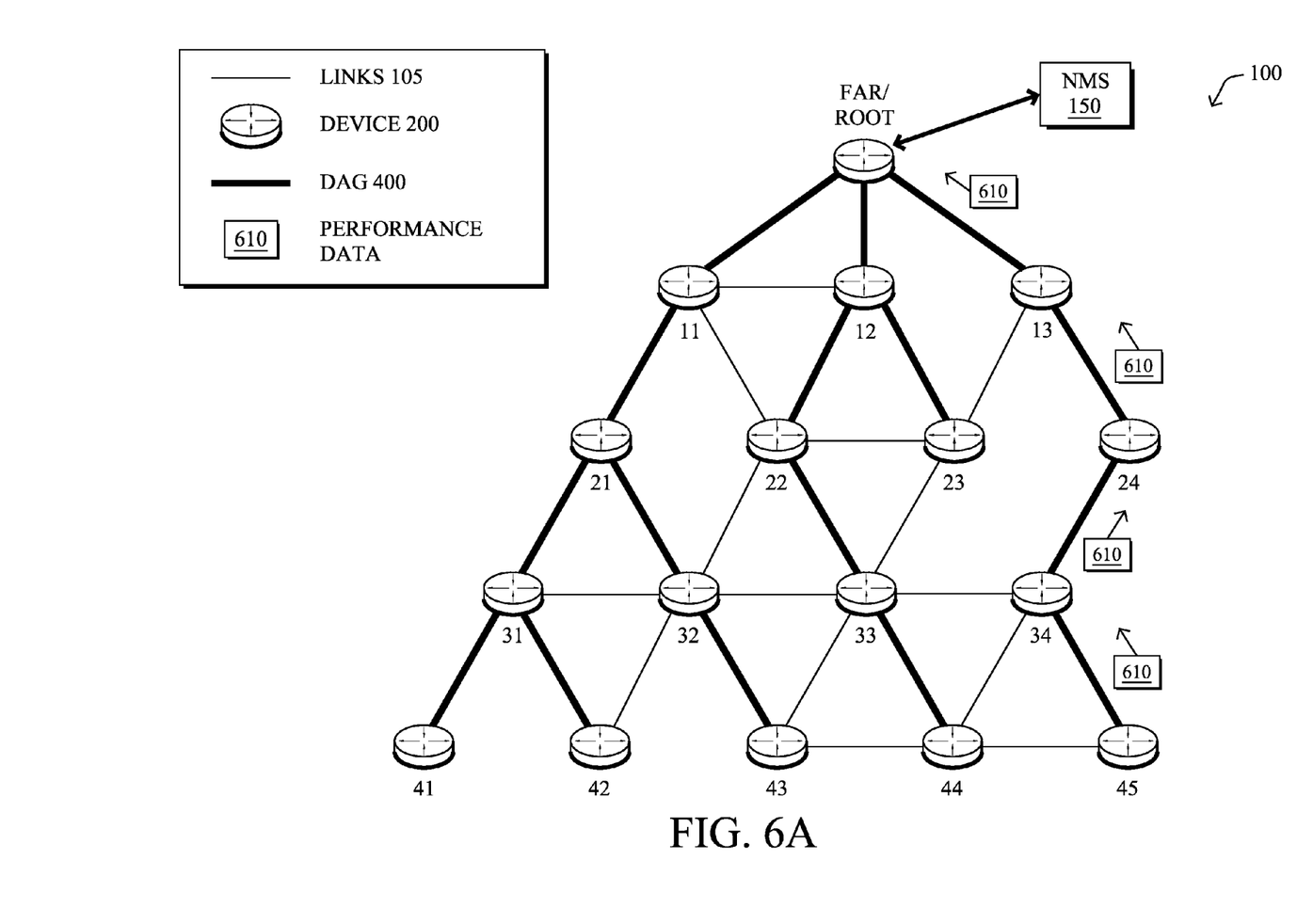
FIGS. 6A-6B illustrate an example of an implemented data rate change.
Figure 6B:
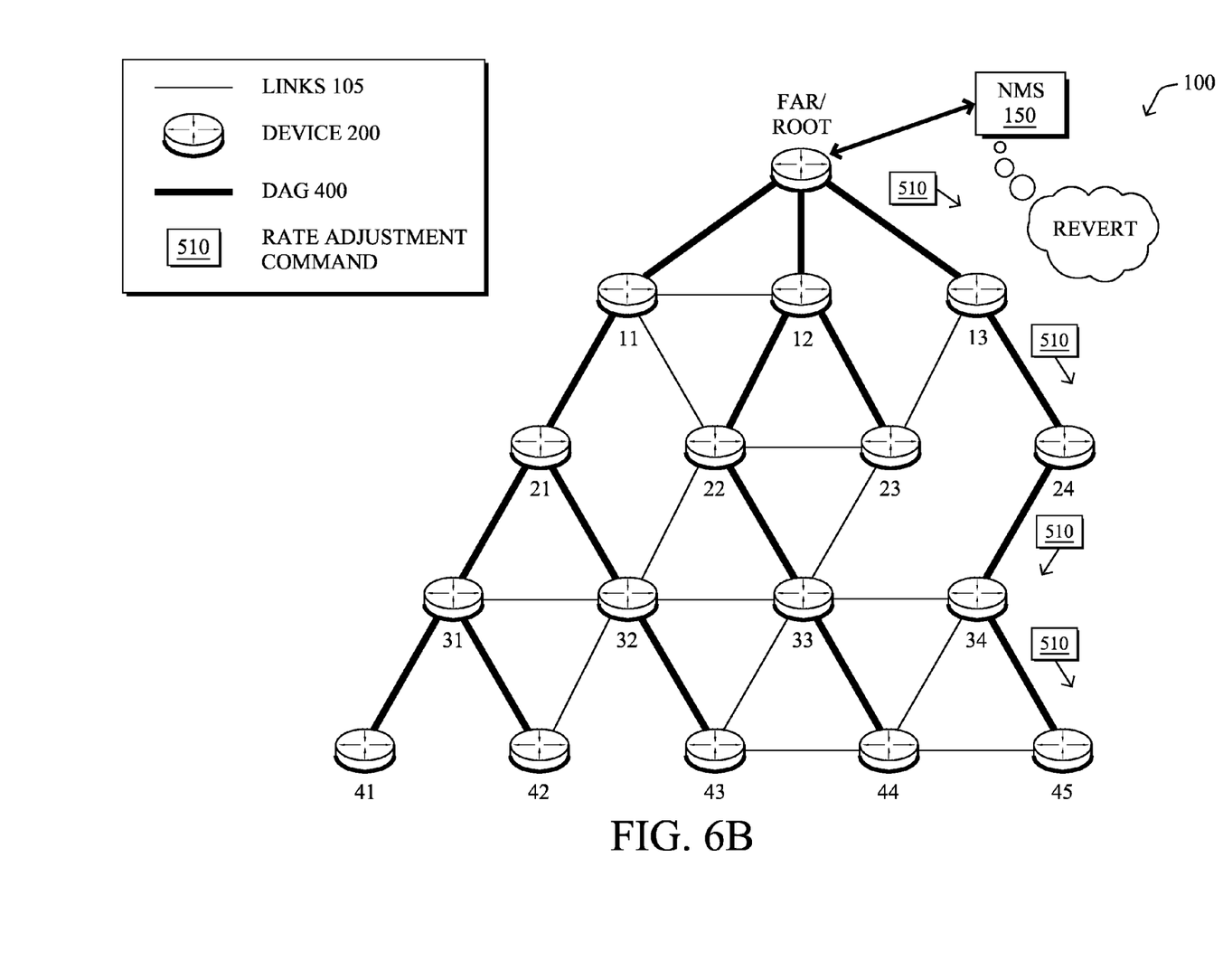

In some embodiments, the centralized device may take an iterative approach to applying data-rate allocation changes. In other words, the centralized device may observe changes in the network after implementing a data rate allocation change, determine whether or not the change has resulted in the expected performance improvement, and take any necessary corrective measures. If the central device observes an improvement in overall performance relative to the SLA or any other network performance metrics, the centralized device can maintain the existing settings and search for more areas of improvement. Otherwise, if the centralized device observes degradation in performance, the central device may choose to revert the changes, record what changes had failed to improve performance, and attempt to search for different ways to improve. For example, as shown in FIGS. 6A-6B, the centralized device may receive performance data 610 from the node(s) affected by the implemented data rate change. In response, the centralized device may decide to maintain the change or, if the network performance has been negatively impacted, revert the data rate to a previously used value (e.g., by sending a rate adjustment command 510 to node 34 and/or to node 45).

Figure 7:
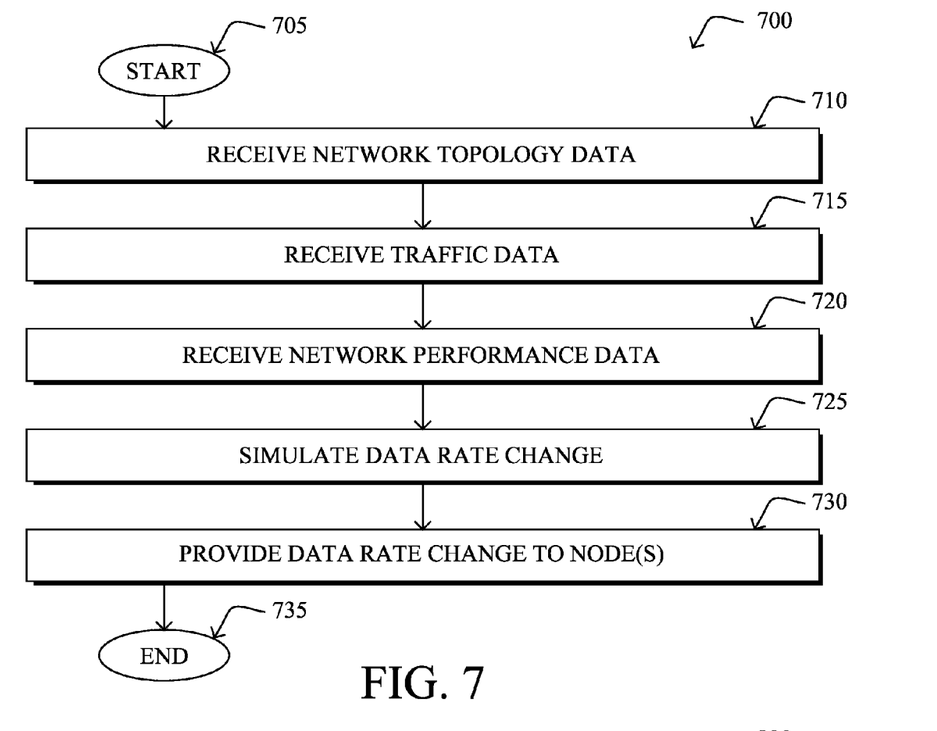
FIG. 7 illustrates an example simplified procedure for adjusting a data rate in a network.

FIG. 7 illustrates an example simplified procedure for adjusting a data rate in a shared-media communication network, in accordance with one or more embodiments described herein. Operationally, procedure 700 may be performed by a centralized network device, such as an NMS, PCE, DAG root, or the like. The procedure 700 starts at step 705, and continues to step 710, where, as described in greater detail above, the centralized device receives network topology data. In some embodiments, the topology data may be received via routing protocol messages, such as an RPL DAO messages. In other embodiments, the topology data may be received via network management protocol messages, such as CSMP. In further embodiments, the topology data may be received from a memory device or other networking device (e.g., from a PCE).

At step 715, the centralized device receives traffic data, as described in greater detail above. The traffic data may indicate, in some cases, the amount of traffic across a given data link within the mesh network. In some cases, the traffic data may also include additional observations regarding the traffic across a data link, such as the reliability, latency, channel utilization, etc., of the link. In various embodiments, the traffic data may be received from an NMS (e.g., by sending a customized CoAP message), computed locally (e.g., by a FAR) based on aggregated traffic data received from the network nodes, or in any other manner.

At step 720, network performance data is also received by the centralized device. As described in greater detail above, the network performance data generally indicates the overall performance of the network and may be, in some cases, SLA data. For example, the network performance data may indicate the existence of bottlenecks in the network, the workloads of the network nodes, jitter or latency measurements, network quality of service (QoS), or other such information regarding the network. This information may be determined locally (e.g., based on aggregated data received from the network nodes), retrieved from a policy engine/NMS, or received from any other network device.

At step 725, the centralized device uses the network topology data, traffic data, and network performance data to simulate a data rate change for one or more nodes in the network. As detailed above, the simulation may entail simulating an increase or decrease to the reception and/or transmission data rate of a particular network node. Thus, the simulation may be used to identify any data link changes that may result (e.g., new links that may result from increasing the range of a node by lowering its data rate, dropped links that may result from decreasing the range of a node by increasing its data rate, etc.), changes to the performance of the network (e.g., changes in channel utilization, workload changes, etc.), etc.

At step 730, a data rate change command may be sent to one or more network nodes, to implement the data rate change that was simulated in step 725. As detailed above, the data rate change command may be sent via a unicast message or via a broadcast message, in various embodiments. For example, a data rate change command may cause a particular network node to decrease its reception data rate. Procedure 700 then ends at step 735. In some embodiments, procedure 700 may be repeated in an iterative manner, to ensure that the actual effects on the network by a data rate change are close to the effects predicted by the simulation (e.g., the data rate change has a positive impact on the network).

Figure 8:
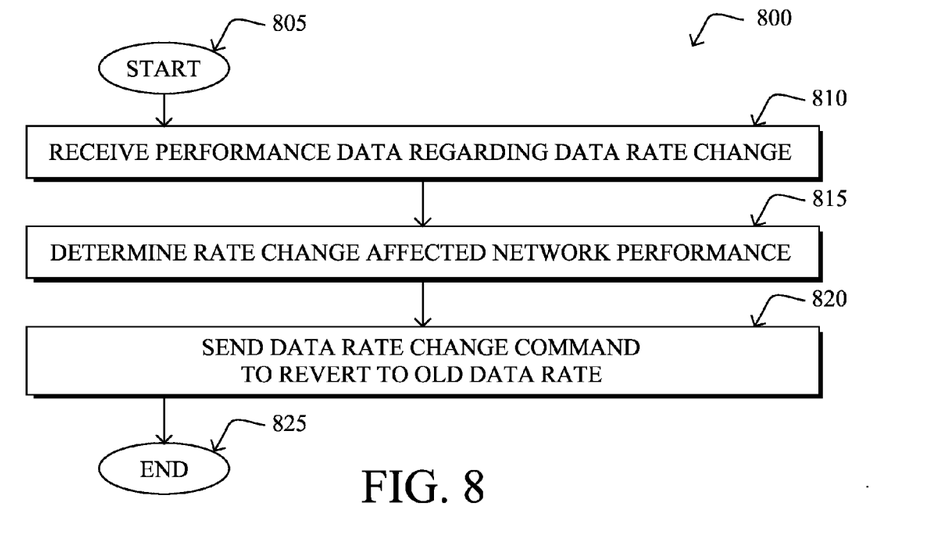
FIG. 8 illustrates an example simplified procedure for reverting an adjusted data rate in a network.

FIG. 8 illustrates an example simplified procedure for reverting an adjusted data rate in a network, in accordance with one or more embodiments described herein. The procedure 800 starts at step 805, and continues to step 810, where, as described in greater detail above, performance data regarding a data rate change may be received (e.g., by a centralized networking device). In general, the received performance data may include any or all information regarding the state of the network after a data rate change is made, such as by procedure 700. For example, the performance data may include, but is not limited to, data indicating the traffic volumes present in the network, link metrics (e.g., packet drops, jitter, delays, etc.), or any other metrics regarding the state of the network after a data rate change has been made.

At step 815, as detailed above, a determination may be made that a given rate change has negatively affected performance of the network. In various cases, for example, the performance data received in step 810 may be analyzed to determine that an adjusted data rate has increased the amount of delays, dropped packets, jitter, etc. in the network or along a given path. In another case, the performance data may be analyzed to determine that an SLA for a particular type of traffic is not being met as a result of the adjusted data rate.

At step 820, a data rate change command may be sent to one or more nodes that instructs the node(s) to revert to a previously used data rate, as described in detail above. For example, as shown in the example of FIG. 6B, NMS 150 may send a rate adjustment command 510 to node 45 that causes node 45 to revert to using a previously used data rate. In other words, the data rate adjustment process by the centralized networking device may be performed iteratively as part of a control loop such that rate adjustments that negatively impact the network may be reverted. Procedure 800 then ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for a centralized network device that assists in determining data rate allocation changes. As opposed to localized control over the data rates, the techniques herein take a holistic approach to the optimization of data rate allocations. Such an approach ensures that the complex tradeoffs in adjusting data rate (e.g., communication range, robustness, throughput, latency, channel utilization, etc.) are all taken into account. This leads to a mesh networking solution that can optimize against the observed traffic flows and necessary SLAs.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving, at a device, topology data regarding a topology of a network;
  receiving, at the device, traffic data for one or more data links in the network;
  receiving, at the device, performance data for the one or more data links;
  simulating, by the device, a data rate change for the one or more data links using the topology data, traffic data, and performance data; and
  providing, by the device, a data rate change command to one or more nodes associated with the one or more data links based on the simulated data rate change.

2. The method as in claim 1, further comprising:
  determining that the simulated data rate change may affect the topology of the network; and
  sending a command to the one or more nodes to recompute the topology of the network.

3. The method as in claim 1, further comprising:
  receiving performance data regarding the data rate change from the one or more nodes;
  determining that the data rate change has affected network performance; and
  sending a second data rate change command to the one or more nodes to revert a particular data link to a previously used data rate.

4. The method as in claim 1, wherein the data regarding the topology of the network is received via a routing protocol message.

5. The method as in claim 1, wherein the data rate change command is a unicast message.

6. The method as in claim 1, wherein the data rate change command is a broadcast message.

7. The method as in claim 1, wherein the device is a root node of the network or a network management server.

8. An apparatus, comprising:
  one or more network interfaces to communicate with a low power and lossy network (LLN);
  a processor coupled to the network interfaces and adapted to execute one or more processes; and
  a memory configured to store a process executable by the processor, the process when executed operable to:
    receive topology data regarding a topology of the LLN;
    receive traffic data for one or more data links in the LLN;
    receive performance data for the one or more data links;
    simulate a data rate change for the one or more data links using the topology data, traffic data, and performance data; and
    provide a data rate change command to one or more nodes associated with the one or more data links based on the simulated data rate change.

9. The apparatus as in claim 8, wherein the process when executed is further operable to:
  determine that the simulated data rate change may affect the topology of the LLN; and
  send a command to the one or more nodes to recompute the topology of the LLN.

10. The apparatus as in claim 8, wherein the process when executed is further operable to:
  receive performance data regarding the data rate change from the one or more nodes;
  determine that the data rate change has affected performance of the LLN; and
  send a second data rate change command to the one or more nodes to revert a particular data link to a previously used data rate.

11. The apparatus as in claim 8, wherein the data regarding the topology of the network is received via a routing protocol message.

12. The apparatus as in claim 8, wherein the data rate change command is a unicast message.

13. The apparatus as in claim 8, wherein the data rate change command is a broadcast message.

14. The apparatus as in claim 8, wherein the apparatus is a root node of the LLN or a network management server.

15. A tangible, non-transitory, computer-readable media having software encoded thereon, the software when executed by a processor operable to:
  receive topology data regarding a topology of a network;
  receive traffic data for one or more data links in the network;
  receive performance data for the one or more data links;
  simulate a data rate change for the one or more data links using the topology data, traffic data, and performance data; and
  provide a data rate change command to one or more nodes associated with the one or more data links based on the simulated data rate change.

16. The computer-readable media as in claim 15, wherein the software when executed is further operable to:
  determine that the simulated data rate change may affect the topology of the network; and
  sending a command to the one or more nodes to recompute the topology of the network.

17. The computer-readable media as in claim 15, wherein the software when executed is further operable to:

receive performance data regarding the data rate change from the one or more nodes;

determine that the data rate change has affected performance of the network; and send a second data rate change command to the one or more nodes to revert a particular data link to a previously used data rate.

18. The computer-readable media as in claim 15, wherein the data regarding the topology of the network is received via a routing protocol message.

19. The computer-readable media as in claim 15, wherein the data rate change command is a unicast message.

20. The computer-readable media as in claim 15, wherein the data rate change command is a broadcast message.

\* \* \* \* \*